United States Patent
Yokoyama (10) Patent No.: US 7,532,352 B2
(45) Date of Patent: May 12, 2009

(54) IMAGE FORMING APPARATUS, INFORMATION PROCESSING METHOD, AND NETWORK SYSTEM

(75) Inventor: Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 11/553,504

(22) Filed: Oct. 27, 2006

(65) Prior Publication Data

US 2007/0103721 A1  May 10, 2007

(30) Foreign Application Priority Data

Nov. 10, 2005 (JP) ............... 2005-326591

(51) Int. Cl.
*G06K 1/00* (2006.01)
(52) U.S. Cl. ...................... 358/1.16; 358/1.15
(58) Field of Classification Search ................ 358/1.13, 358/1.15, 403, 1.16
See application file for complete search history.

(56) References Cited

U.S. PATENT DOCUMENTS

| | | | | |
|---|---|---|---|---|
| 5,220,674 A | * | 6/1993 | Morgan et al. ............... | 709/223 |
| 5,467,434 A | * | 11/1995 | Hower et al. ............... | 358/1.15 |
| 5,995,721 A | * | 11/1999 | Rourke et al. ............... | 358/1.15 |
| 6,631,008 B2 | * | 10/2003 | Aoki ............... | 358/1.15 |
| 6,814,512 B2 | * | 11/2004 | Kato ............... | 400/76 |
| 6,863,456 B1 | * | 3/2005 | Kato ............... | 400/76 |
| 6,909,520 B2 | * | 6/2005 | Ogino ............... | 358/1.15 |
| 7,158,257 B2 | * | 1/2007 | Hosoda ............... | 358/1.15 |
| 7,346,673 B1 | * | 3/2008 | Oda ............... | 709/223 |

FOREIGN PATENT DOCUMENTS

| JP | 06149501 A | * | 5/1994 |
|---|---|---|---|
| JP | 2003-256173 | | 9/2003 |

* cited by examiner

*Primary Examiner*—Kimberly A Williams
(74) *Attorney, Agent, or Firm*—Cowan, Liebowitz & Latman, P.C.

(57) ABSTRACT

An object of this invention is to improve user friendliness when an image forming apparatus outputs accessibly stored data having undergone an image forming process by another image forming apparatus. To achieve this object, an image forming apparatus according to this invention which can perform an image forming process for received data and output the data, and communicably connects to another image forming apparatus includes a holding unit configured to hold profile information, an acquisition unit configured to acquire property information on data which has undergone the image forming process by the other image forming apparatus and is accessibly stored, a comparison unit configured to compare the profile information with the property information, and a display unit configured to display a list of data stored in the other image forming apparatus together with an icon corresponding to the comparison result of the comparison unit.

15 Claims, 11 Drawing Sheets

| |
|:---:|
| A1 |
| RAW-image |
| monochrome |
| 600 |
| degrade |

FIG. 8

| |
|---|
| image-2 |
| 200411181234 |
| RAW-image |
| monochrome |
| 600 |
| 35400 |
| A1 |

IMAGE FORMING APPARATUS, INFORMATION PROCESSING METHOD, AND NETWORK SYSTEM

BACKGROUND OF THE INVENTION

1. Field of the Invention

The present invention relates to a processing technique of sharing data stored in an image forming apparatus such as a printing apparatus or multifunctional peripheral.

2. Description of the Related Art

Recently, distributed processing technology called grid computing has become available. A system has also appeared which adopts a so-called "distributed storage technology" of sharing storage distributed at geographically separate locations using the grid computing mechanism.

Grid computing is named after the transmission line grid of an electric power company. This technique virtualizes computing resources distributed on a network and distributes processes.

A grid computing-applied system is generally comprised of at least one computer called a master node. The computing resources of other computers (nodes) which form a grid are assigned with identifiers which are called handles and are unique in the grid. The master node monitors states such as CPU occupancy and memory utilization at each node, thereby executing so-called "scheduling" to determine and select a node optimal for performing a process at a given timing, and assign a process to the node.

The contents of concrete processes in a system employing the distributed storage technology using grid computing will now be explained simply. In locating (sharing) data managed and saved at each node in a distributed storage system, each node requests a master node to generate data. The master node generates a unique handle, associates it with the requesting node, and returns the handle to the node. The node associates the returned handle with managed/saved data.

Data located in the distributed storage system is processed by the following procedures. First, a node other than the master node transmits an operation request with a designated handle to the master node. Then, the master node transfers the operation request to a handle-associated node. The associated node executes a process corresponding to the operation request.

In this manner, the grid computing system has the merit of allowing a requesting source to manipulate data designated by a handle without being aware of which node actually manages and saves the data.

In addition to the distributed storage technology using grid computing, there have been made various proposals for sharing stored data even in the field of image forming apparatuses such as a printing apparatus and multifunctional peripherals. For example, Japanese Patent Laid-Open No. 2003-256173 discloses an invention of sharing information stored in the save unit (e.g., a hard disk drive or nonvolatile memory) of an image forming apparatus.

An image forming apparatus of this type receives a print job, performs an image forming process, and sets a shared flag. A job having a shared flag is treated as a job identifiable and operable by another image forming apparatus.

Recent image forming apparatuses are often comprised of a save area (dedicated hard disk) called a "box". The box is a save area storing data (print images) having undergone an image forming process so as to quickly print out scanned data, FAX-received data, print data transmitted from an information processing apparatus, and the like.

Among various data saved in the image forming apparatus, data (print image stored in the box) having undergone an image forming process is also sharable in addition to the above-mentioned print job. At present, the image forming apparatus can employ distributed storage technology based on grid computing to gain some of its merits.

However, the following problems arise when sharing a print image stored in the box of an image forming apparatus (saving it accessibly from another image forming apparatus) using various "data sharing" techniques as described above.

For example, an degraded image may be generated when an external image forming apparatus outputs (e.g., prints) a shared print image. This is because an image forming apparatus which stores a shared print image and an external image forming apparatus which outputs it may have different processing characteristics.

As described above, a print image stored in the box is data having undergone an image forming process in order to print it out, and is unique data corresponding to the processing characteristic of the image forming apparatus. In many cases, another image forming apparatus cannot directly use the data.

This case is highly likely to manifest in the future because of rapid changes in processible data formats along with recent technical developments in image forming apparatuses.

In sharing print images stored in the box of an image forming apparatus, it is necessary to examine an output process method for the shared print images in another image forming apparatus. For example, it is desirable to configure each image forming apparatus to determine whether it can normally output a shared print image, so as not to actually output a degraded image. With this configuration, the image forming apparatus can avoid wasteful output of degraded images, which is convenient for users.

SUMMARY OF THE INVENTION

The present invention has been made to overcome the above drawbacks, and has as its object to improve user friendliness when an image forming apparatus outputs accessibly stored data having undergone an image forming process by another image forming apparatus.

In order to achieve the above object, a network system according to the present invention is comprised of the following configuration. That is, a network system in which a plurality of image forming apparatuses capable of performing an image forming process for received data and outputting the data connect to each other communicably, each image forming apparatus comprising:

a storage unit configured to store data having undergone an image forming process by the image forming apparatus in correspondence with property information on the data so as to allow another image forming apparatus to access the data;

a holding unit configured to hold profile information of the image forming apparatus;

a comparison unit configured to compare the profile information of the image forming apparatus with property information corresponding to data which has undergone the image forming process and is stored in a storage unit of another image forming apparatus; and a display unit configured to display a list of data which have undergone the image forming process and are stored in the storage unit of the other image forming apparatus, in accordance with a comparison result of the comparison unit.

In order to achieve the above object, an image forming apparatus according to the present invention is comprised of the following arrangement. That is, an image forming apparatus which can perform an image forming process for received data and output the data, and communicably connects to another image forming apparatus, comprising:

a holding unit configured to hold profile information;

an acquisition unit configured to acquire property information on data which has undergone the image forming process by the other image forming apparatus and is accessibly stored;

a comparison unit configured to compare the profile information with the property information; and a display unit configured to display a list of data accessibly stored in the other image forming apparatus, in accordance with a comparison result of the comparison unit.

In order to achieve the above object, an information processing method according to the present invention is comprised of the following steps. That is, an information processing method in an image forming apparatus which can perform an image forming process for received data and output the data, and communicably connects to another image forming apparatus, comprising the steps of:

holding profile information;

acquiring property information on data which has undergone the image forming process by the other image forming apparatus and is accessibly stored;

comparing the profile information with the property information; and displaying a list of data stored in the other image forming apparatus in accordance with a comparison result in the comparing step.

In order to achieve the above object, an image forming apparatus according to the present invention is comprised of the following arrangement. That is, an image forming apparatus comprising:

a holding unit configured to hold profile information;

an acquisition unit configured to acquire property information on data which has undergone an image forming process by another image forming apparatus connected via a network and is accessibly stored;

a comparison unit configured to compare the profile information with the property information; and an output unit configured to cause a display unit to display reference information when printing the data accessibly stored in the other image forming apparatus, in accordance with a comparison result of the comparison unit.

The present invention can improve user friendliness when an image forming apparatus outputs accessibly stored data having undergone an image forming process by another image forming apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

<Configuration of Network System>

Figure 1:
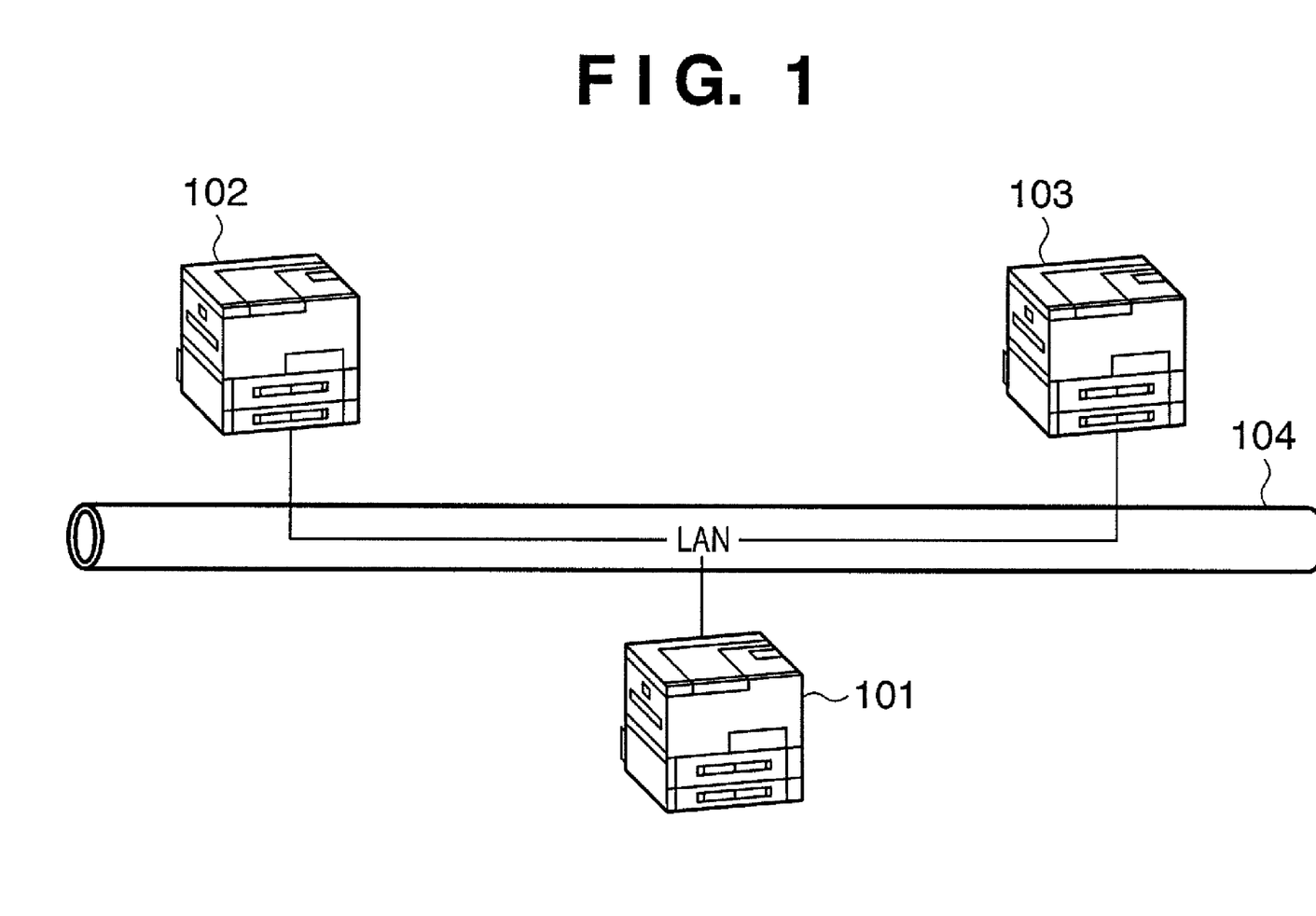
FIG. 1 is a view showing the configuration of a network system according to the first embodiment of the present invention.

FIG. 1 is a view showing the configuration of a network system according to the first embodiment of the present invention. Image forming apparatuses 101, 102, and 103 connect to a LAN (Local Area Network) 104 such as Ethernet, and can directly communicate with each other.

In FIG. 1, the image forming apparatuses connect to the same LAN, but the present invention is not limited to this. For example, the image forming apparatuses may connect to a WAN (Wide Area Network) configured by connecting a plurality of LANs to each other. The first embodiment is feasible regardless of which of LANs forming the WAN connects each image forming apparatus, and the image forming apparatuses need not always connect to the same LAN.

<Outline of Distributed Storage System in Image Forming Apparatus>

Figure 2:
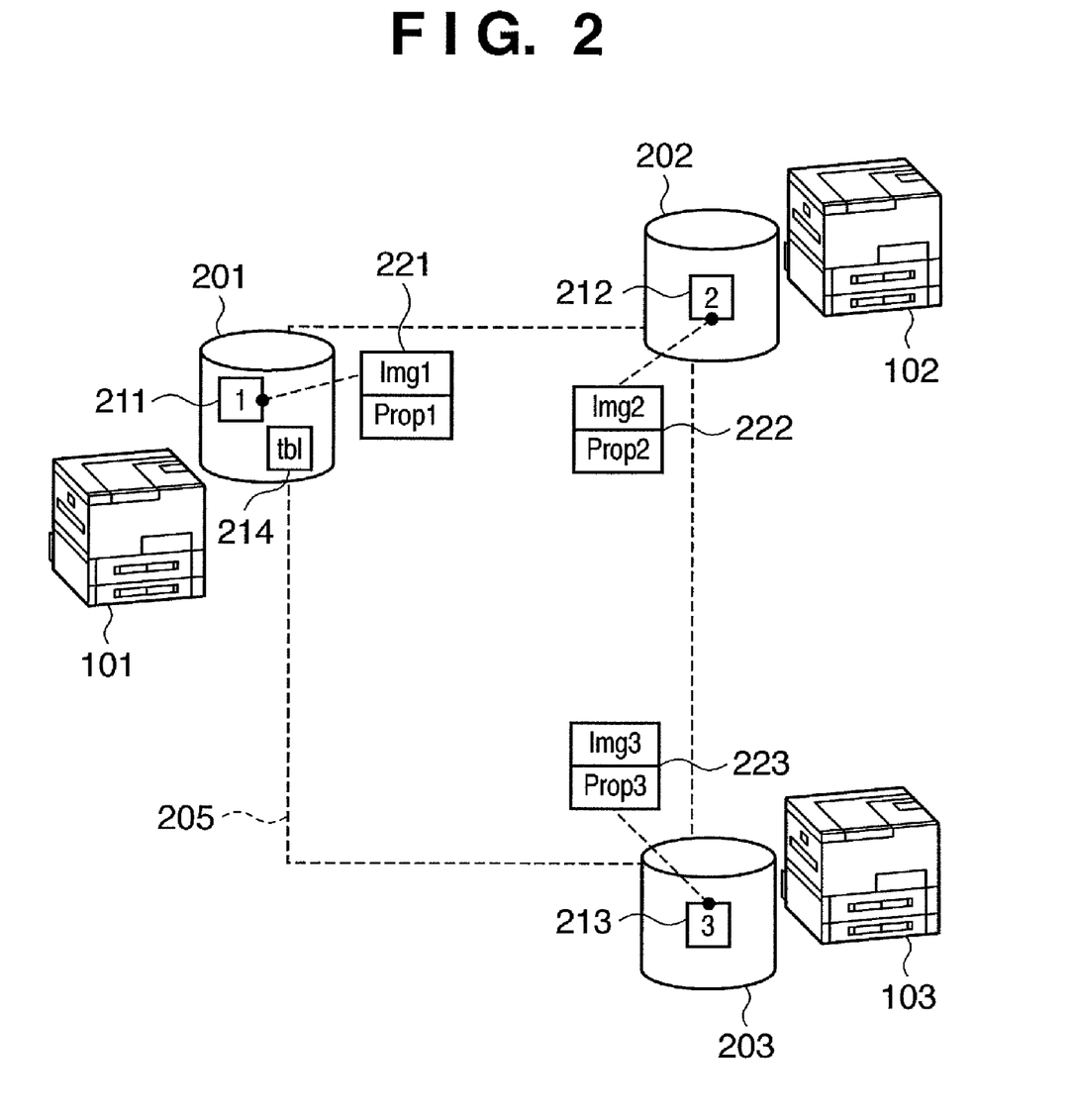
FIG. 2 is a view showing an outline of the network system in FIG. 1 which adopts the distributed storage technology based on grid computing and shares print images stored in respective image forming apparatuses.

FIG. 2 is a view showing an outline of the network system in FIG. 1 which adopts the distributed storage technology based on grid computing and shares print images respectively stored in the image forming apparatuses 101, 102, and 103.

The image forming apparatuses 101, 102, and 103 respectively comprise data save units 201, 202, and 203 each of which functions as a box for saving print images having undergone an image forming process and is implemented by, e.g., a hard disk or another storage device. The image forming apparatuses 101, 102, and 103 can mutually refer to print images saved in them via a distributed storage 205. The distributed storage is a group of the storage areas of the image forming apparatuses. Although the entity of the group does not exist, the distributed storage regards this group as a virtual storage area equal in size to the sum of storage areas laid open to public by the image forming apparatuses.

The data save unit 201 of the image forming apparatus 101 saves a management table 214 and print image 211. The distributed storage 205 stores a print image 221 serving as a mapped image of the print image 211 by making a setting to lay the print image 211 open to public. The print image 221 is associated with property information (details of which will be described later) representing the attributes and properties of data.

Conventionally, when accessing the print image 211 in the data save unit 201 of the image forming apparatus 101, the user must explicitly "designate the image forming apparatus 101 and then designate the print image 211 of the image forming apparatus 101". When, however, accessing the print image 221 serving as a mapped image in the distributed storage, the user suffices to simply designate the "print image 221" without being aware of which image forming apparatus actually saves the print image 221.

Similarly, a print image 212 saved in the data save unit 202 of the image forming apparatus 102 can be referred to as a print image 222 in the distributed storage 205. A print image 213 saved in the data save unit 203 of the image forming apparatus 103 can be referred to as a print image 223 in the distributed storage 205. The print images 222 and 223 are associated with property information.

In the network system of FIG. 1, the image forming apparatus 101 is called a master node, and holds, in the data save unit 201, the management table 214 which manages identification information of all data accessible in the distributed storage 205.

<Arrangement of Image Forming Apparatus>

Figure 3:
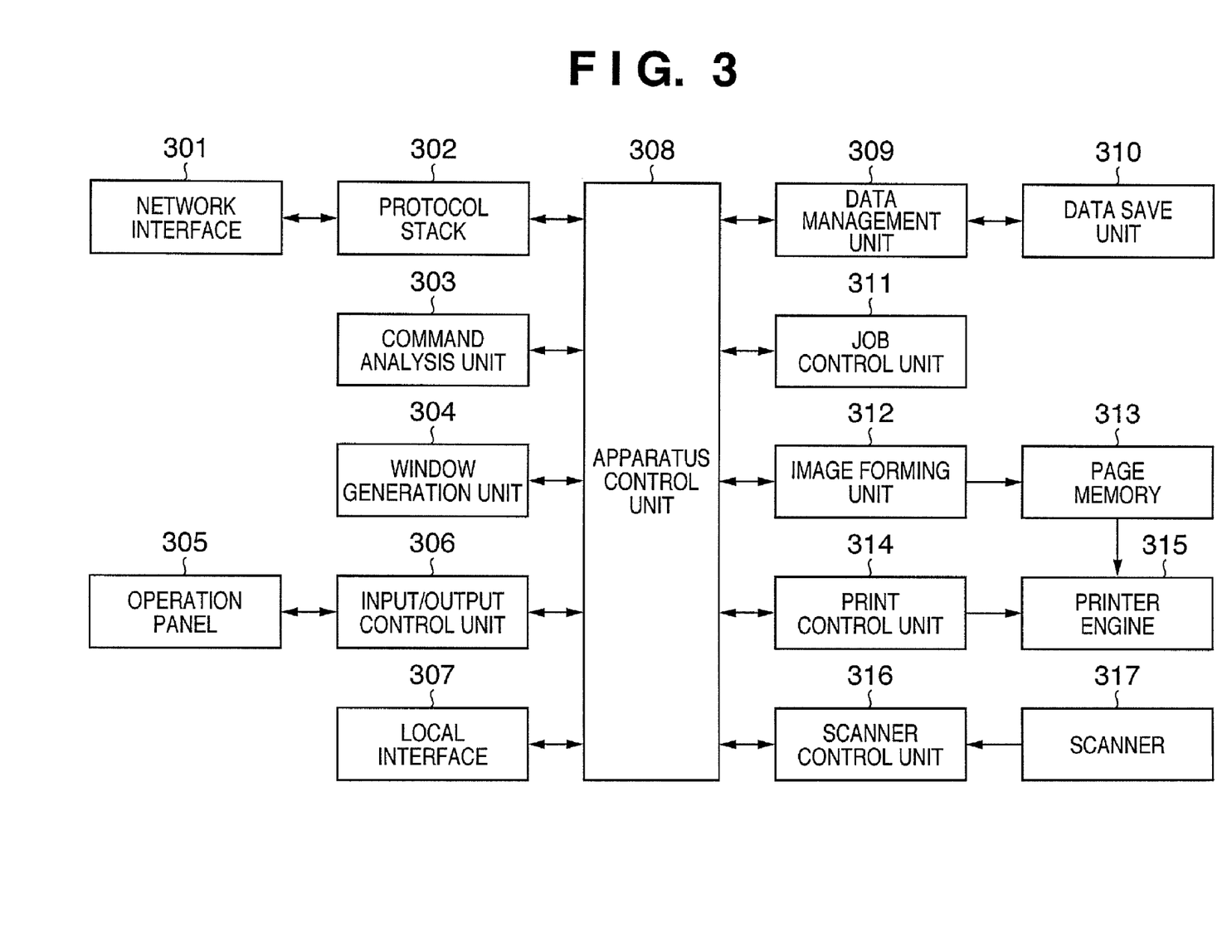
FIG. 3 is a block diagram showing the internal arrangement of each image forming apparatus which builds the network system according to the first embodiment of the present invention.

FIG. 3 is a block diagram showing the internal arrangement of the image forming apparatuses 101, 102, and 103 which build the network system according to the first embodiment of the present invention. A network interface 301 connects to the LAN 104 in FIG. 1, and communicates with an apparatus similarly connected to the LAN 104 or an apparatus connected to another LAN connectable via the LAN 104.

A protocol stack 302 processes each protocol of data received from the LAN 104 by the network interface 301. A command analysis unit 303 receives the resultant data and analyzes its contents under the arbitration of an apparatus control unit 308. When the analysis by the command analysis unit 303 reveals that the received data is a print request called a print job, the print job is saved in a print queue which occupies a predetermined area of a data save unit 310 under the control of a data management unit 309.

The print queue is a FIFO (First In First Out) type queue. In general, data are printed in the save order in the print queue, but the print order can also be changed in accordance with a job control instruction. A job control unit 311 monitors the print queue in the data save unit 310, and when the print queue pools many print jobs, inquires of a print control unit 314 whether printing is possible. If printing is possible, the job control unit 311 transfers, to an image forming unit 312, print data contained in a print job at the start of the print queue in the data save unit 310.

The image forming unit 312 performs various image forming processes to convert print data into a print image. The image forming unit 312 transfers a generated 1-page print image to a page memory 313. When detecting that the page memory 313 holds the print image, the print control unit 314 instructs a printer engine 315 to print the contents of the page memory 313 on a print medium. A print request is processed by repeating the image forming process in the image forming unit 312, expansion in the page memory 313, and the print process by the printer engine 315 for all pages of print data in the print job.

A print image generated in a print process is stored in a predetermined area (area functioning as a box) of the data save unit 310 upon reception of an instruction from the user who transmitted the received data.

The image forming apparatus comprises a local interface 307 such as an IEEE1284 interface or USB (Universal Serial Bus) interface, in addition to the network interface 301. The local interface 307 can accept a process request from an information processing apparatus or the like. An input/output control unit 306 acquires the state of the image forming apparatus from the apparatus control unit 308. A window generation unit 304 generates a display window on the basis of the apparatus state.

The input/output control unit 306 displays a display window generated by the window generation unit 304 on an operation panel 305, and accepts detection of contact with a user's finger from the operation panel 305. The apparatus control unit 308 executes a process corresponding to a window element such as a button at the contact position. Reference numeral 316 denotes a scanner control unit which controls a scanner 317 to acquire image data of a document and saves the image data in a predetermined area of the data save unit 310 under the control of the data management unit 309.

<Layout of Operation Panel of Image Forming Apparatus>

Figure 4:
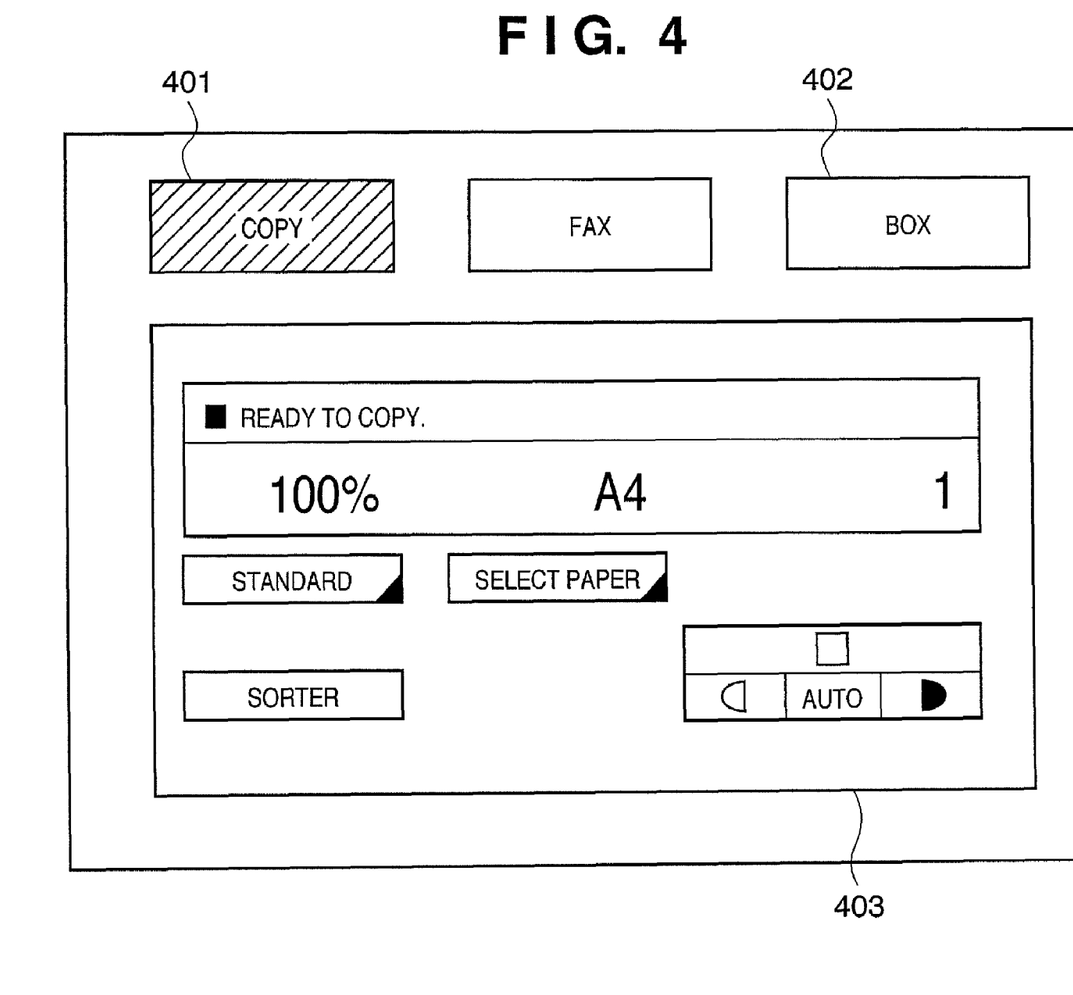
FIG. 4 is a view showing an example of a copy window displayed on the operation panel of the image forming apparatus.

FIG. 4 shows an example of the layout of a window displayed on the operation panel 305 in FIG. 3. Reference numeral 401 denotes a copy button which is hatched in FIG. 4 to represent that a content display area 403 currently displays a copy-related setting window (copy window). Reference numeral 402 denotes a box button which is pressed when performing an operation associated with a print image saved in a specific area of the data save unit 310 in FIG. 3.

<Apparatus Profile Information of Image Forming Apparatus>

Figure 7:
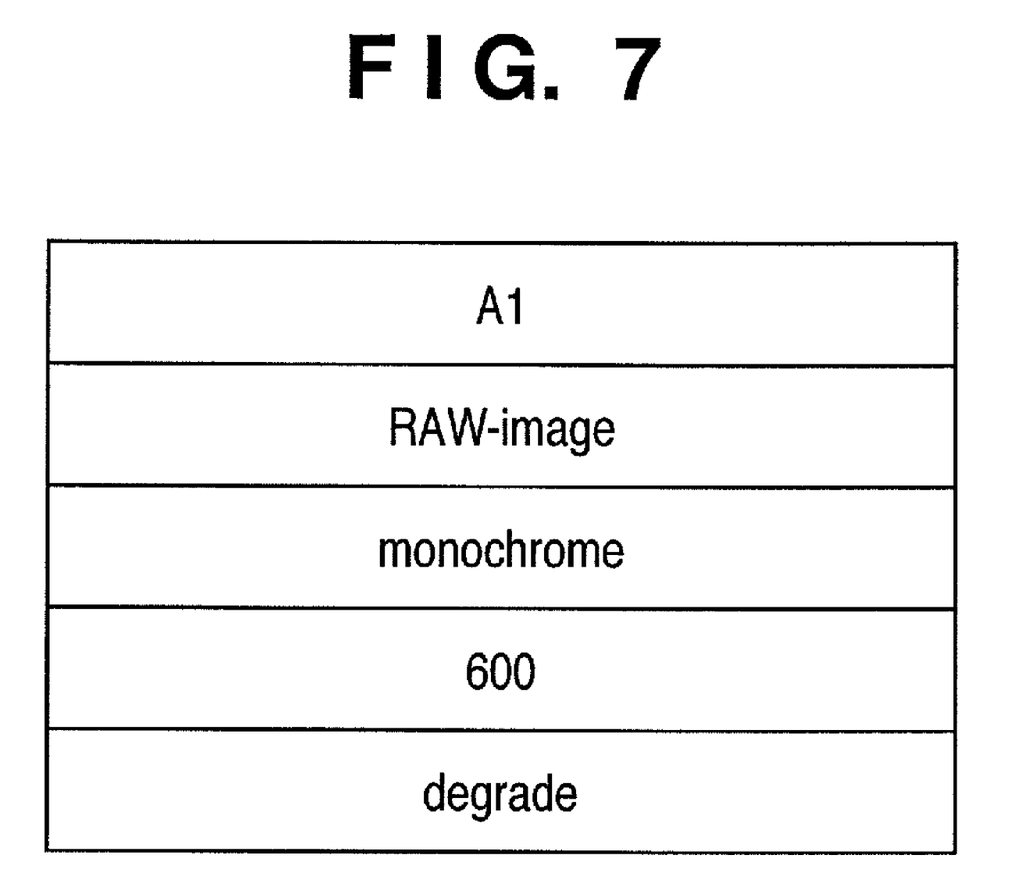
FIG. 7 is a table showing an example of apparatus profile information saved in the image forming apparatus according to the first embodiment of the present invention.

FIG. 7 shows an example of an apparatus profile information entry representing data properties and process precisions (to be referred to as "processing characteristics" hereinafter) which are saved in the data save unit 310 of each image forming apparatus and are processible by the image forming apparatus. In the first embodiment, the apparatus profile information (=a set of various types of setting information) contains a set of entries including the following pieces of information.

Apparatus name (corresponding to "A1" in FIG. 7)
    Format ("RAW-image" in FIG. 7)
    Color information ("monochrome" in FIG. 7)
    Resolution ("600" dpi in FIG. 7)
    Process precision ("degrade" in FIG. 7: this means that the image quality is degraded when processing data.)

<Property Information of Data Located in Distributed Storage>

Figure 8:
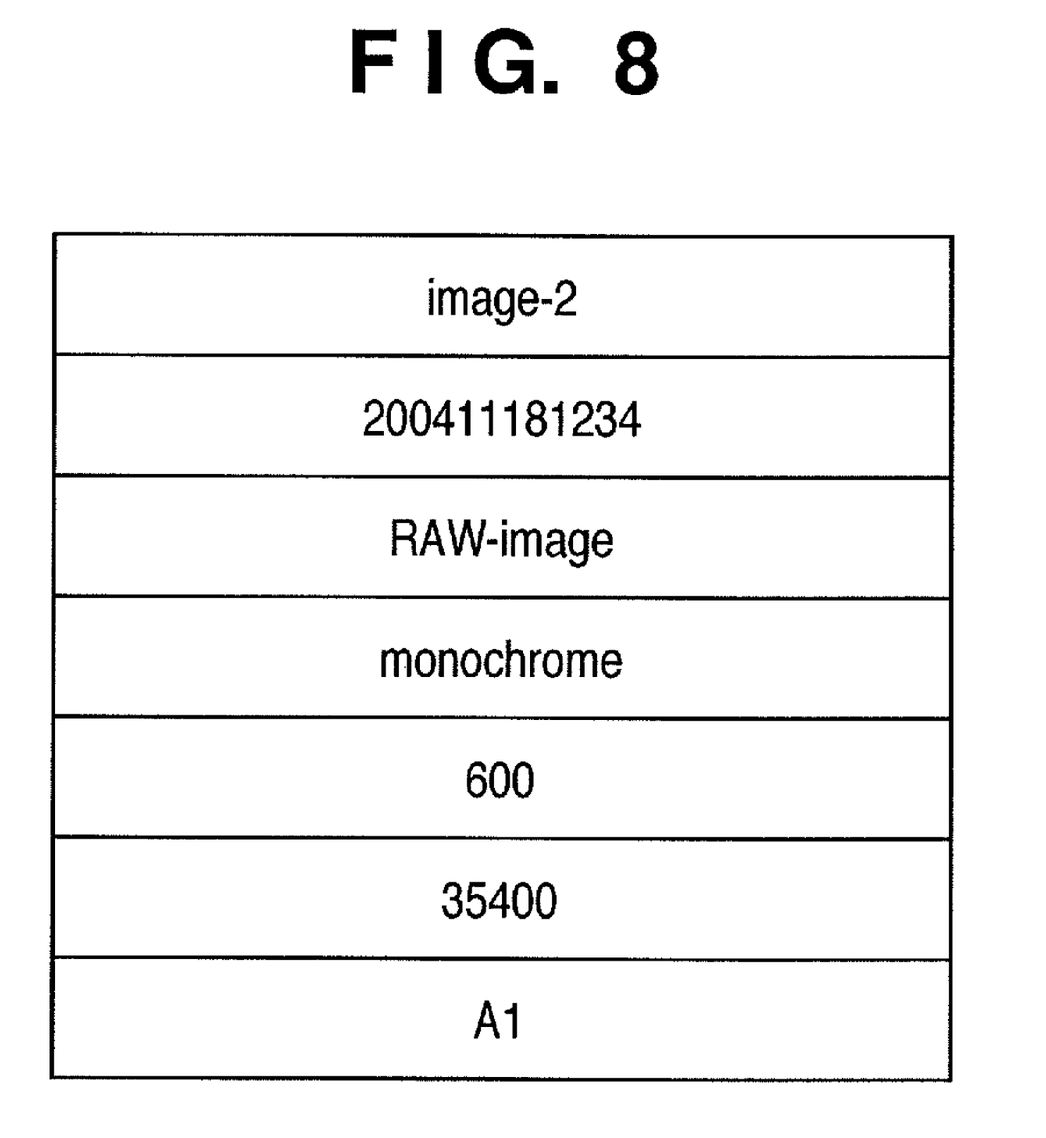
FIG. 8 is a table showing an example of property information corresponding to a print image located in a distributed storage.

FIG. 8 shows an example of the structure of property information which is associated with data (print image) located in the distributed storage and represents data attributes and properties. The property information contains the following pieces of information.

Data name (corresponding to "image-2" in FIG. 8)
    Registration date & time ("200411181234" in FIG. 8 representing 2004/11/18 12:34)

Format ("RAW-image" in FIG. 8 representing an apparatus-specific image format)
Color information ("monochrome" in FIG. 8)
Resolution ("600" dpi in FIG. 8)
Size ("35400" bytes in FIG. 8)
Generation apparatus ("A1" in FIG. 8)

<User Interface of Box Function in Image Forming Apparatus>

Process procedures when the image forming apparatus 102 acquires information on a print image stored in the distributed storage and displays information on the print image on the operation panel 305 in the network system of FIG. 2 will be explained. A process by the image forming apparatus 102 will be described, but the image forming apparatuses 101 and 103 can also execute the same process.

Figure 6:
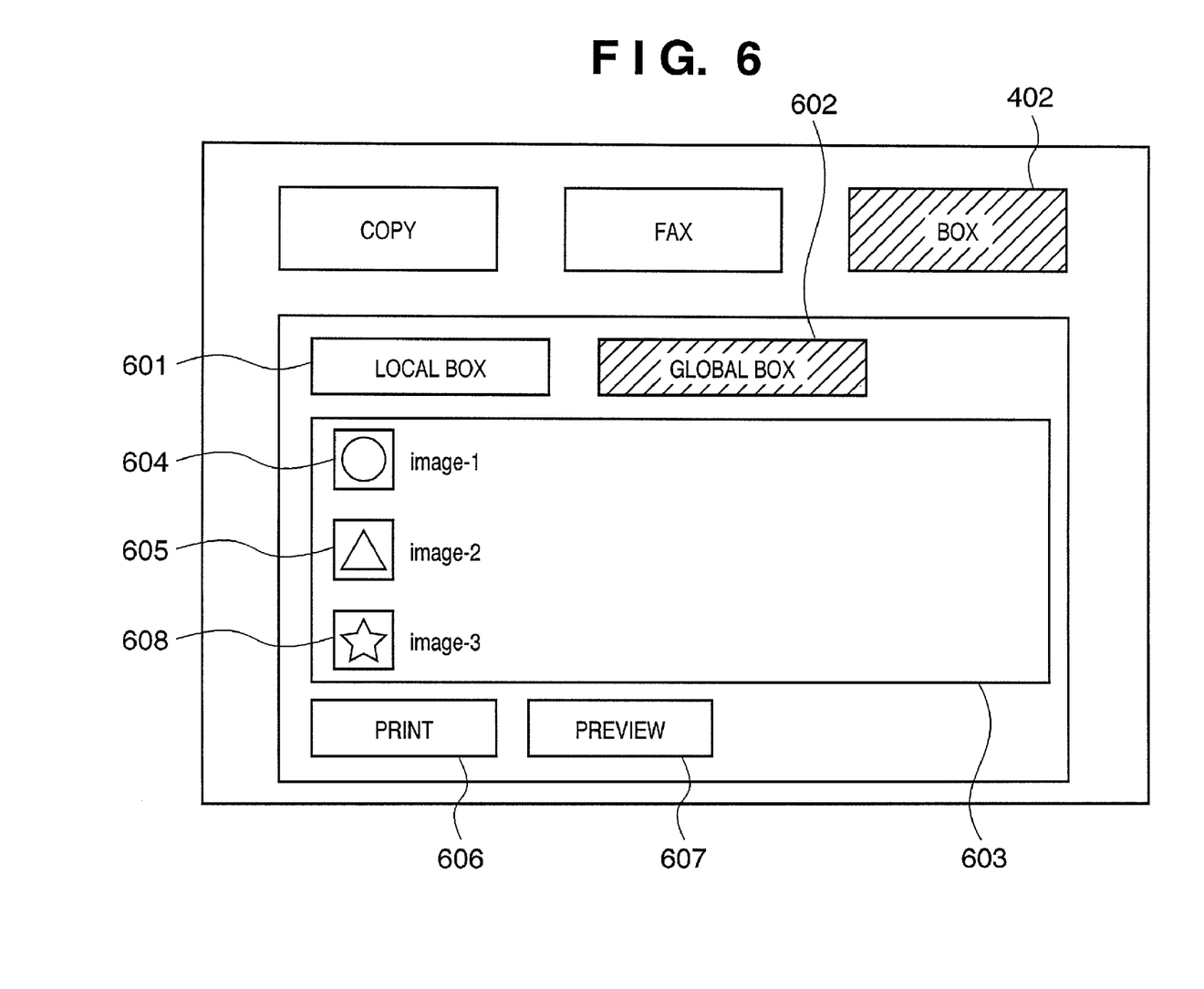
FIG. 6 is a view showing an example of a box window displayed on the operation panel of the image forming apparatus according to the first embodiment of the present invention.

When the user presses the box button 402 while the operation panel 305 displays a copy window as shown in FIG. 4, the display switches to a box operation window shown in FIG. 6. The box operation window has a local box button 601 for displaying information (e.g., the data name of a print image) on a print image saved in a specific area of the data save unit 310 in the image forming apparatus 102. The box operation window also has a global box button 602 for displaying information on a print image located in the distributed storage.

A data list 603 displays information representing print images stored in a box selected by designating the local box button 601 or global box button 602 by the user. The user selects one or a plurality of data displayed on the data list 603.

While selecting the data in the data list 603, the user presses a print button 606 to print the selected data. The user presses a preview button 607 to preview the selected data.

<Process Procedures when Pressing Global Box Button>

A process until the data list 603 displays a list of data after the user presses the global box button 602 in the box operation window shown in FIG. 6 will be described in detail with reference to FIG. 5.

Figure 5:
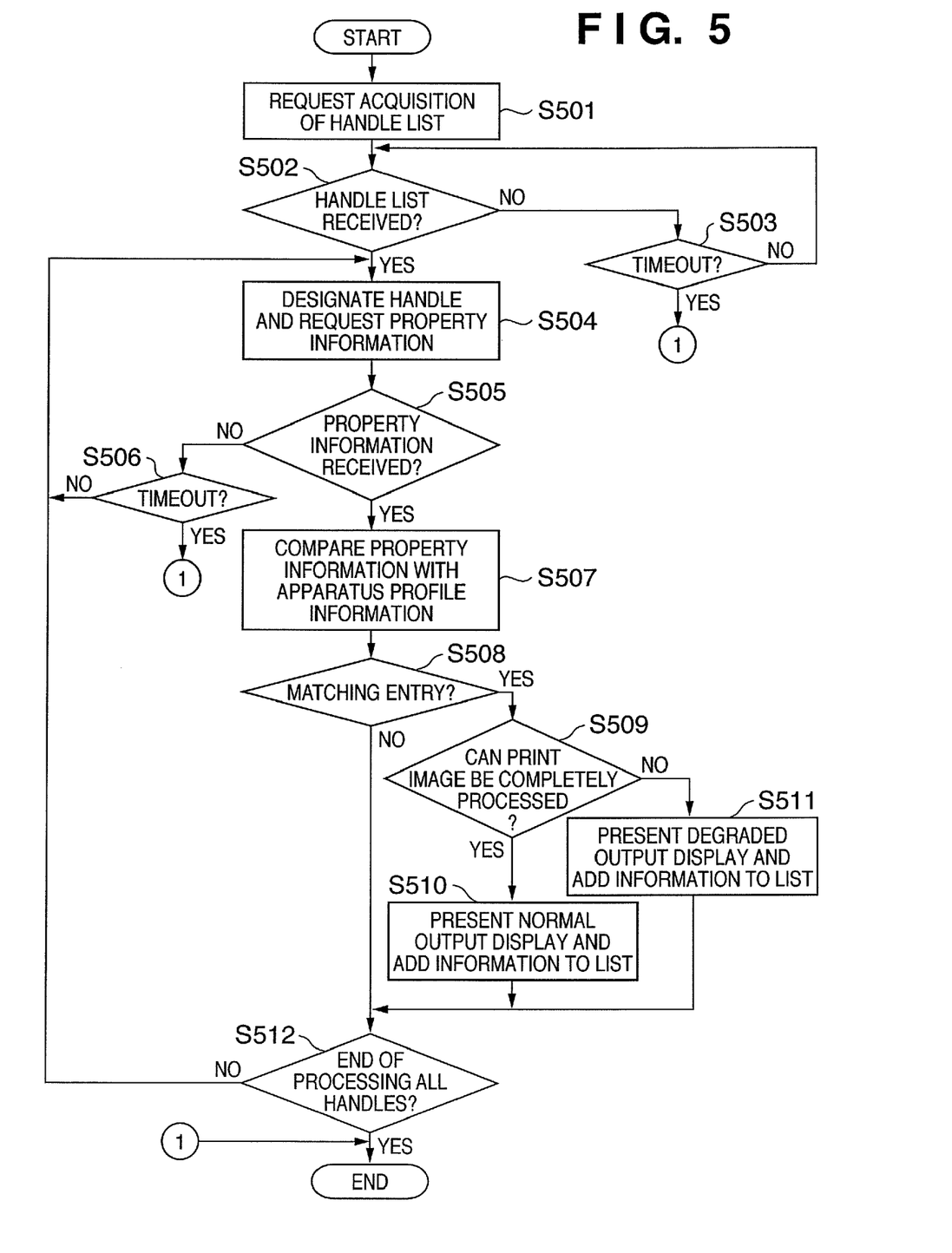
FIG. 5 is a flowchart showing the operation of the image forming apparatus according to the first embodiment of the present invention.

When the user presses the global box button 602, the image forming apparatus 102 requests, of the master node among image forming apparatuses which build the distributed storage, a list of handles corresponding to data located in the distributed storage in step S501 of FIG. 5. Since the image forming apparatus 101 serves as the master node in FIG. 2, the image forming apparatus 102 transmits the handle list request to the image forming apparatus 101.

In step S502, the image forming apparatus 102 determines whether it has received a response to the handle list request. If the image forming apparatus 102 has not received any response, it determines in step S503 whether a predetermined timeout time has elapsed. If the image forming apparatus 102 determines in step S503 that the timeout time has elapsed, the process ends. In this case, the data list 603 does not display any data. If no timeout time has elapsed in step S503, the process returns to step S502.

If the image forming apparatus 102 receives a handle list in step S502, it transmits a property information request for each handle to the image forming apparatus 101 serving as the master node in step S504.

In step S505, the image forming apparatus 102 determines whether it has received property information described with reference to FIG. 8. If the image forming apparatus 102 has not received property information, it determines in step S506 whether a predetermined timeout time has elapsed. If the image forming apparatus 102 determines in step S506 that the timeout time has elapsed, the process ends. If no timeout time has elapsed, the process returns to step S505.

If the image forming apparatus 102 receives property information in step S505, it compares the received property information with apparatus profile information (FIG. 7) saved in the data save unit 310 in step S507 to determine whether the apparatus profile information contains an entry matching the received property information.

If the image forming apparatus 102 determines as a result of comparison in step S508 that the apparatus profile information does not contain the matching entry, the process advances to step S512. If the image forming apparatus 102 determines as a result of comparison in step S508 that the apparatus profile information contains the matching entry, the process advances to step S509.

In step S509, the image forming apparatus 102 refers to the process precision field of a corresponding entry in the property information to determine whether the image forming apparatus can properly print out. If the image forming apparatus 102 determines that it can properly print out, the process advances to step S510. In step S510, the data list 603 in FIG. 6 presents "normal output display" and displays information (e.g., a data name) on the print image. Then, the process advances to step S512. This normal output display is a visual effect such as an icon display "○" 604 in FIG. 6.

If the image forming apparatus 102 determines in step S509 that it cannot properly print out (the process precision field in the device profile information exhibits "degrade"), the data list 603 presents "degraded output display" in step S511. At the same time, the data list 603 displays information (e.g., a data name) on the print image. Then, the process advances to step S512.

The degraded output display is a visual effect such as an icon display "Δ" 605 in FIG. 6. In step S512, the image forming apparatus 102 determines whether all handles have undergone the property information acquisition process. If No in step S512, the process returns to step S504; if YES, the process ends.

As described above, the image forming apparatus according to the first embodiment executes the following characteristic processes in a system which comprises a plurality of image forming apparatuses and adopts the distributed storage technology using grid computing.

More specifically, the image forming apparatus displays, on its operation panel, information on a print image located in the distributed storage. At this time, The image forming apparatus compares property information which is associated with each print image and describes the properties of each print image, with apparatus profile information saved in the image forming apparatus.

Only when a matching entry exists, the image forming apparatus displays it as a data list.

The image forming apparatus determines from the process precision field in the entry whether it can appropriately print out a print image, and presents to the user whether the print image is properly output, or degraded and output.

By these processes, when an image forming apparatus is to output accessibly stored data having undergone an image forming process by another image forming apparatus having different processing characteristics, the user can determine in advance whether the image forming apparatus can normally output the data. As a result, the user can avoid wasteful output of an degraded image in advance.

The first embodiment has described the display process on the operation panel 305 of the image forming apparatus, but the display process is not limited to this.

Recently, image forming apparatuses have introduced a remote UI function which allow managing or operating an image forming apparatus by an operation from a Web browser running on an information processing apparatus connectable via a network, similar to the operation panel 305.

It is also possible to use the remote UI function and display a data list of print images located in the distributed storage in accordance with an instruction from, e.g., the Web browser of an information processing apparatus communicable via the LAN 104.

Second Embodiment

In the first embodiment, the data list does not display a print image having property information which does not match the entry of apparatus profile information which is saved in an image forming apparatus and represents the processing characteristics of the image forming apparatus. However, the display process is not limited to this.

For example, other network-connected image forming apparatuses sometimes include an image forming apparatus having a data conversion function. This image forming apparatus may be used to output a print image.

Figure 9:
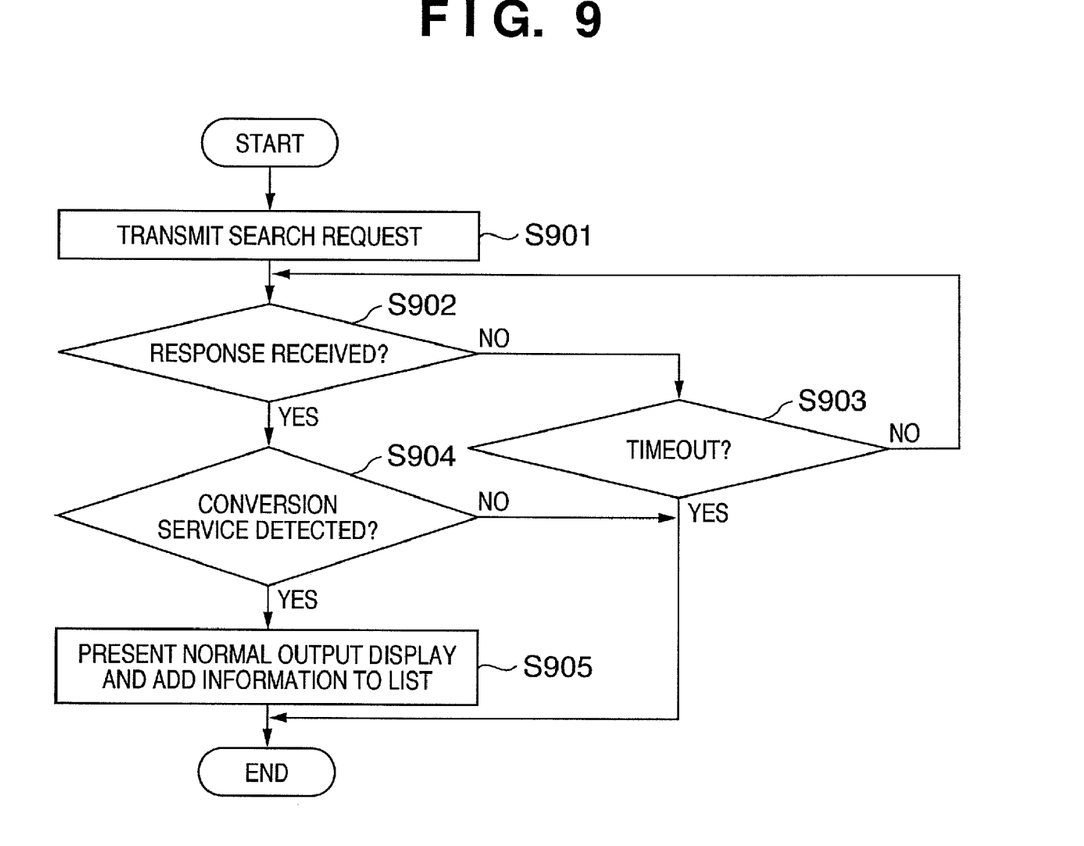
FIG. 9 is a flowchart showing a conversion service search operation in an image forming apparatus according to the second embodiment of the present invention.

In this case, when an image forming apparatus according to the second embodiment determines in step S508 of FIG. 5 that there is no entry which matches apparatus profile information, it starts a process as shown in FIG. 9.

In step S901, the image forming apparatus transmits, to a master node, a conversion service search request containing the first entry of apparatus profile information and property information of a print image.

Upon reception of the conversion service search request, the master node transmits it to each image forming apparatus (node) participating in the distributed storage. For example, the master node waits for a response from each node for a predetermined period, and if it does not receive any response during this period, transmits non-detection of the conversion service to the requesting image forming apparatus.

Immediately when the master node receives a conversion enable response within the predetermined period, it notifies the requesting image forming apparatus that the master node has detected the conversion service. In step S902, the image forming apparatus determines whether it has received a response to the search request. If the image forming apparatus has not received any response, it determines in step S903 whether a predetermined timeout time has elapsed. If the image forming apparatus determines in step S903 that no timeout time has elapsed, the process returns to the reception determination process in step S902. If the image forming apparatus determines that the timeout time has elapsed, the process ends.

If the requesting image forming apparatus receives a response in step S902, it determines in step S904 whether the master node has detected the conversion service. If the image forming apparatus determines that it has received no detection of the conversion service from the master node, the process ends. If the image forming apparatus determines in step S904 that it has received detection of the conversion service from the master node, it adds information (e.g., the data name of a print image) on the print image to the data list 603 in step S905, and ends the display process.

According to the first embodiment, the image forming apparatus can output a proper image when adding information to the data list in step S905, so the data list displays the icon "○". In the use of the conversion service, however, completing all the process takes a long time because another apparatus performs a conversion process before the target apparatus executes an output process such as printing. To notify the operator of a message to this effect, it is desirable to distinguish the print image from another data by a visual effect such as an icon display "560" 608 in FIG. 6.

According to the second embodiment, even when data located in the distributed storage does not have a format properly processable by the image forming apparatus, the data list 603 displays information on the print image as far as an image forming apparatus having the data conversion service exists.

More specifically, the image forming apparatus inquires, of each node which builds the distributed storage, whether the node can convert the data format of data into a data format processable by the image forming apparatus. If an apparatus capable of converting the data exists, the data list displays information on the data.

Third Embodiment

In the first embodiment, the data list displays even data whose image degrades but can ensure a predetermined level. An image forming apparatus capable of obtaining an appropriate image from such data may exist near the target image forming apparatus. In this case, user friendliness can improve by outputting data from the processible image forming apparatus.

Figure 10:
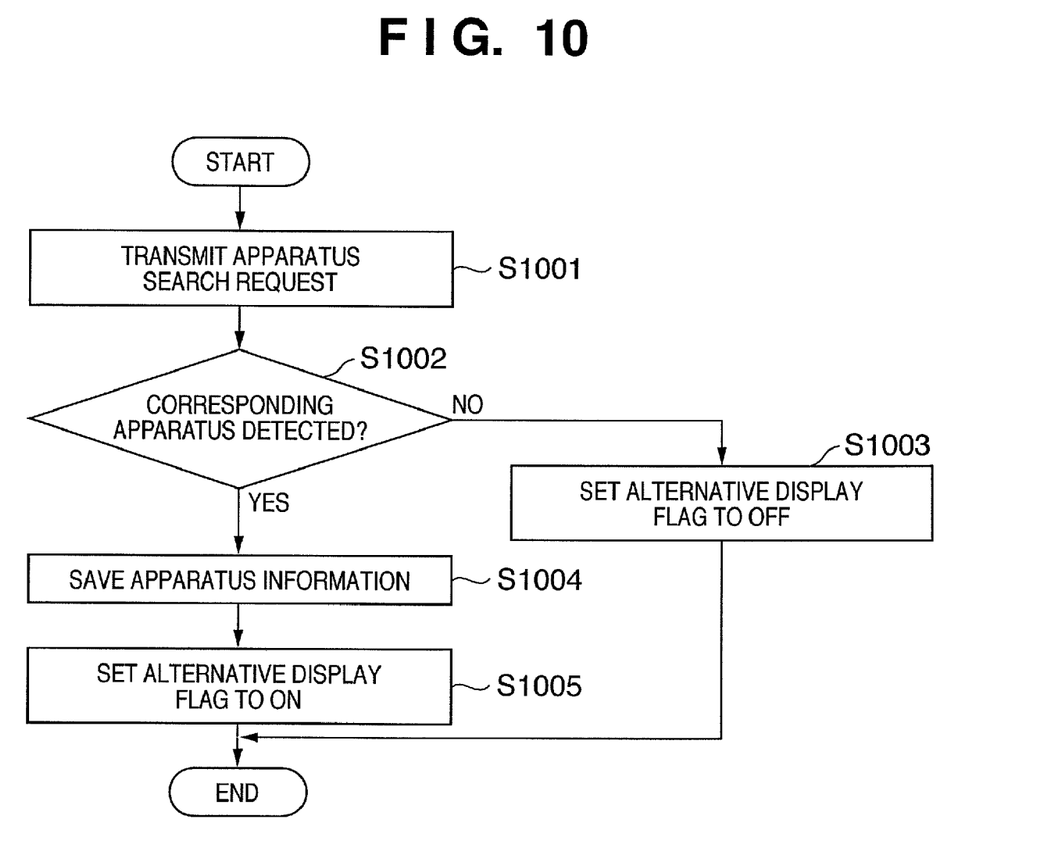
FIG. 10 is a flowchart showing an alternative processing apparatus search operation in an image forming apparatus according to the third embodiment of the present invention.

For this purpose, when an image processing apparatus according to the third embodiment determines in step S509 of FIG. 5 that it cannot attain a proper printout, it executes the process of a flowchart in FIG. 10.

In step S1001, the image forming apparatus transmits an image forming apparatus search request containing property information of a print image to a master node.

Upon reception of this request, the master node transmits it to each node which builds the distributed storage. The master node collects responses received from nodes within a predetermined period, and returns an image forming apparatus detection response containing information such as the apparatus name, IP address and comment of each node to the requesting image forming apparatus.

If no node sends back an acknowledgement to the master node, i.e., a node capable of appropriately processing a data format contained in the image forming apparatus search request does not exist as an image forming apparatus which builds the distributed storage, the master node returns an image forming apparatus non-detection response.

If the response from the master node is an image forming apparatus non-detection response in step S1002, the image forming apparatus sets an alternative display flag to OFF in step S1003, and the process ends. The alternative display flag is saved in a nonvolatile memory (not shown), and referred to by an input/output control unit 306.

If the image forming apparatus receives an image forming apparatus detection response in step S1002, it saves information on the image forming apparatus contained in the response in step S1004, and sets the alternative display flag to ON in step S1005. Then, the process ends.

If the operator selects the data from a data list 603 in FIG. 6 and presses a print button 606, the input/output control unit 306 detects the press of the button, and refers to the alternative display flag in the nonvolatile memory. If the alternative display flag is OFF, the input/output control unit 306 performs a normal print process; if ON, it displays a message that an image forming apparatus capable of properly printing out exists.

Figure 11:
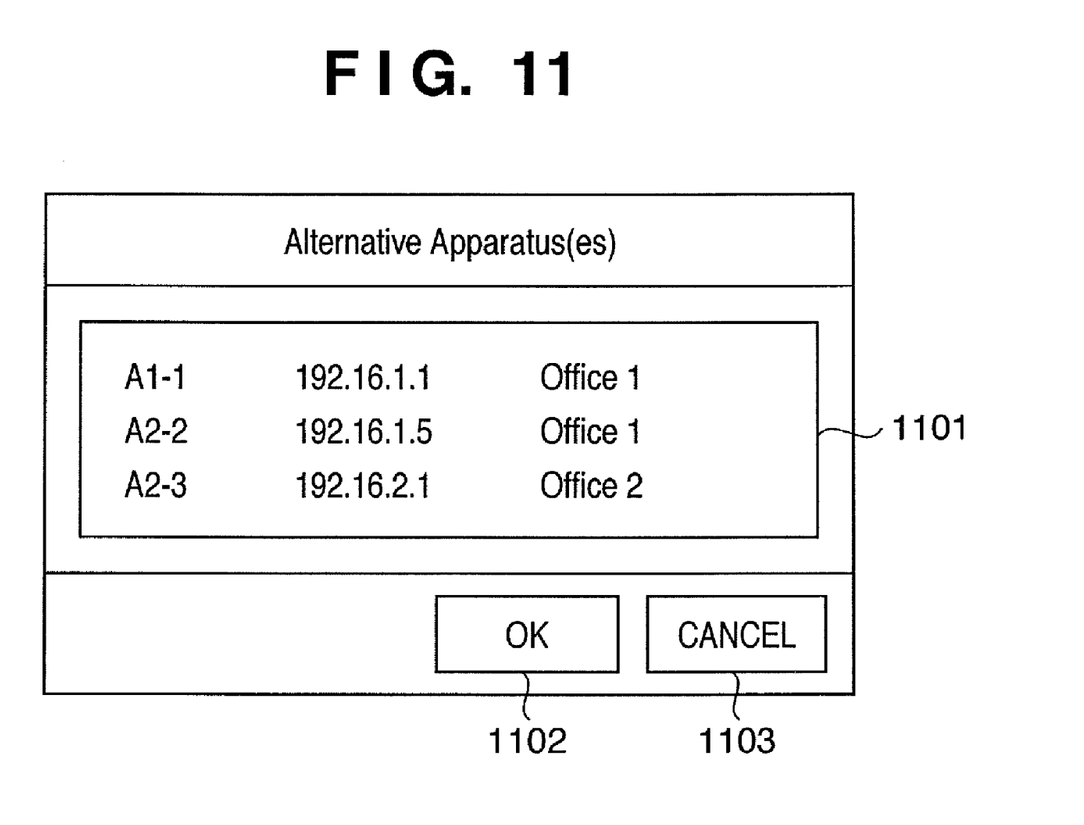
FIG. 11 shows an example of a list of image forming apparatuses window displayed on the operation panel 305 in FIG. 3.

If the operator designates not to execute any alternative process, the image forming apparatus performs a normal print process. If the operator designates the alternative process, the image forming apparatus displays a list (saved in step S1004 of FIG. 10) of image forming apparatuses capable of properly printing out the print image. FIG. 11 shows an example of a list of image forming apparatuses window displayed on the operation panel 305 in FIG. 3. Reference numeral 1101 denotes a list of image forming apparatuses capable of properly printing out. If the user presses a CANCEL button 1103 in the display window, the image forming apparatus performs a normal print process. If the user presses an OK button 1102 in the display window after selecting any image forming apparatus, the image forming apparatus transmits a print request containing the handle of the print image to the selected image forming apparatus, and causes the selected image forming apparatus to print the print image.

According to the third embodiment, when the distributed storage holds a print image which will degrade in outputting it from an image forming apparatus, the image forming apparatus searches image forming apparatuses which build the distributed storage for an apparatus capable of properly processing the print image. If the image forming apparatus detects the processible apparatus, it asks the user whether to perform an alternative process by the processible apparatus after the user requests printing of the print image. When the user desires the alternative process, the processible apparatus can appropriately print out.

Fourth Embodiment

The first to third embodiments have described the network system employing the grid computing technique, but the present invention is not particularly limited to this. Another alternative technique is also applicable to implementing a distributed storage, and implementing process requests (conversion service search request, a request to search for an apparatus capable of properly printing out, and a request to print by the apparatus) to another image forming apparatus.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which records software program codes for implementing the functions of the above-described embodiments to a system or apparatus. In this case, these functions are achieved by reading out and executing the program codes stored in the storage medium by the computer (or the CPU or MPU) of the system or apparatus. In this case, the storage medium which stores the program codes constitutes the present invention.

The storage medium for supplying the program codes includes a floppy® disk, hard disk, optical disk, magneto optical disk, CD-ROM, CD-R, magnetic tape, nonvolatile memory card, and ROM.

The present invention is not limited to a case where the functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

Furthermore, the present invention includes a case where the functions of the above-described embodiments are implemented after the program codes read out from the storage medium are written in the memory of a function expansion board inserted into the computer or the memory of a function expansion unit connected to the computer. That is, the present invention also includes a case where after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-326591, filed on Nov. 10, 2005, which is hereby incorporated by reference herein in its entirety.

What is claimed is:

1. A network system in which a plurality of image forming apparatuses capable of performing an image forming process for received data and outputting the data connect to each other communicably, each image forming apparatus comprising:
   a storage unit configured to store data having undergone an image forming process by the image forming apparatus in correspondence with property information on the data so as to allow another image forming apparatus to access the data;
   a holding unit configured to hold profile information of the image forming apparatus;
   a comparison unit configured to compare the profile information of the image forming apparatus with property information corresponding to data which has undergone the image forming process and is stored in a storage unit of another image forming apparatus; and
   a display unit configured to display, before printing a data which have undergone the image forming process by the other image forming apparatus, whether the data can be printed in a first image quality or a second image quality which is lower than the first image quality, wherein the image quality of the data is determined in accordance with a comparison result of said comparison unit.

2. The system according to claim 1, further comprising a first request unit configured to, when determining as a result of comparison by said comparison unit that the image forming apparatus cannot properly output data which has undergone the image forming process and is stored in the storage unit of the other image forming apparatus, request another image forming apparatus to search for an image forming apparatus capable of converting the data.

3. The system according to claim 2, further comprising a second request unit configured to, when determining as a result of comparison by said comparison unit that the image forming apparatus cannot properly output data which has undergone the image forming process and is stored in the storage unit of the other image forming apparatus, request another image forming apparatus to search for an image forming apparatus capable of properly outputting the data.

4. The system according to claim 3, further comprising a third request unit configured to request another image forming apparatus to output data having undergone an image process in the image forming apparatus capable of properly outputting the data.

5. The system according to claim 2, wherein said display unit displays the list of data in accordance with a search result by the other image forming apparatus.

6. The system according to claim 1, wherein the network system includes a grid computing system, and comprises an image forming apparatus functioning as a master node and an image forming apparatus functioning as a node.

7. An image forming apparatus which can perform an image forming process for received data and output the data, and communicably connects to another image forming apparatus, comprising:
a holding unit configured to hold profile information;
an acquisition unit configured to acquire property information on data which has undergone the image forming process by the other image forming apparatus and is accessibly stored;
a comparison unit configured to compare the profile information with the property information;
an image forming unit configured to perform the image forming process for data accessibly stored; and
a display unit configured to display, before printing a data which have undergone the image forming process by the other image forming apparatus, whether the data can be printed in a first image quality or a second image quality which is lower than the first image quality, wherein the image quality of the data is determined in accordance with a comparison result of said comparison unit.

8. The apparatus according to claim 7, further comprising a first request unit configured to, when determining as a result of comparison by said comparison unit that the image forming apparatus cannot properly output data accessibly stored in the other image forming apparatus, request another image forming apparatus to search for an image forming apparatus capable of converting the data.

9. The apparatus according to claim 8, further comprising a second request unit configured to, when determining as a result of comparison by said comparison unit that the image forming apparatus cannot properly output data accessibly stored in the other image forming apparatus, request another image forming apparatus to search for an image forming apparatus capable of properly outputting the data.

10. The apparatus according to claim 8, further comprising a third request unit configured to request another image forming apparatus to output accessibly stored data in the image forming apparatus capable of properly outputting the data.

11. The apparatus according to claim 7, wherein said display unit displays the list of data in accordance with a search result by the other image forming apparatus.

12. The apparatus according to claim 7, wherein the image forming apparatus functions as a node of a grid computing system.

13. An information processing method in an image forming apparatus which can perform an image forming process for received data and output the data, and communicably connects to another image forming apparatus, comprising the steps of:
holding profile information;
acquiring property information on data which has undergone the image forming process by the other image forming apparatus and is accessibly stored;
comparing the profile information with the property information;
performing the image forming process for data accessibly stored; and
displaying, before printing a data which have undergone the image forming process by the other image forming apparatus, whether the data can be printed in a first image quality or a second image quality which is lower than the first image quality, wherein the image quality of the data is determined in accordance with a comparison result in the comparing step.

14. A computer readable medium having stored thereon a program which causes a computer to execute an information processing method defined in claim 13.

15. An image forming apparatus comprising:
a holding unit configured to hold profile information;
an acquisition unit configured to acquire property information on data which has undergone an image forming process by another image forming apparatus connected via a network and is accessibly stored;
a comparison unit configured to compare the profile information with the property information;
an image forming unit configured to perform the image forming process for data accessibly stored; and
an output unit configured to cause a display unit to display, before printing the data accessibly stored in the other image forming apparatus, whether the data can be printed in a first image quality or a second image quality which is lower than the first image quality, wherein the image quality is determined in accordance with a comparison result of said comparison unit.

* * * * *